United States Patent
Kamura et al.

(10) Patent No.: US 7,270,366 B2
(45) Date of Patent: Sep. 18, 2007

(54) AUTOMOTIVE FLOOR PANEL STRUCTURE

(75) Inventors: Takanobu Kamura, Hiroshima-ken (JP); Akinori Utsunomiya, Hiroshima-ken (JP); Tsuyoshi Sugihara, Hiroshima-ken (JP); Masaru Chikita, Hiroshima-ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 73 days.

(21) Appl. No.: 10/980,874

(22) Filed: Nov. 4, 2004

(65) Prior Publication Data

US 2005/0116507 A1 Jun. 2, 2005

(30) Foreign Application Priority Data

Nov. 11, 2003 (JP) .............................. 2003-381389

(51) Int. Cl.
*B62D 25/20* (2006.01)
(52) U.S. Cl. ............ 296/193.07; 296/204; 296/187.08; 296/191; 296/39.3
(58) Field of Classification Search ........... 296/193.07, 296/204, 184.1, 191, 203.01, 1.03, 39.3; 181/207; 267/90, 136

See application file for complete search history.

(56) References Cited

U.S. PATENT DOCUMENTS

| | | | | |
|---|---|---|---|---|
| 2,856,226 A * | 10/1958 | Purdy | .......................... | 296/204 |
| 3,940,176 A * | 2/1976 | Ito et al. | ................. | 296/187.09 |
| 4,402,545 A | 9/1983 | Utsunomiya et al. | | |
| 4,593,949 A * | 6/1986 | Tanimoto | .................... | 296/204 |
| 5,127,704 A * | 7/1992 | Komatsu | .................... | 296/204 |
| 5,992,926 A * | 11/1999 | Christofaro et al. | ........ | 296/204 |
| 6,138,996 A * | 10/2000 | Hayashi et al. | ............. | 267/136 |
| 6,536,566 B2 * | 3/2003 | Hasegawa et al. | .......... | 188/378 |
| 6,793,276 B2 * | 9/2004 | Sugihara et al. | ............ | 296/204 |

FOREIGN PATENT DOCUMENTS

| | | |
|---|---|---|
| EP | 1-281-604 A2 | 2/2003 |
| JP | 09-202269 | 8/1997 |
| JP | 2002-160674 A | 6/2002 |
| JP | 2002-337749 A | 11/2002 |

OTHER PUBLICATIONS

Translation of JP 09-202269.*
Feb. 17, 2005 European Search Report for Application No. EP-04-02-6169.

* cited by examiner

*Primary Examiner*—D Glenn Dayoan
*Assistant Examiner*—Greg Blankenship
(74) *Attorney, Agent, or Firm*—Nixon Peabody LLP; Donald R. Studebaker

(57) ABSTRACT

The present invention is a floor panel structure of a car body that can reduce noise within the automobile cabin. The present invention is a car body floor panel structure wherein the floor of an automobile has a floor panel connected to car body frame members, and also a predetermined mode of vibration is generated to suppress the generation of acoustic emission from the floor panel. The floor panel vibration mode adjusting structure has rectangular rigidity adjusting areas that are formed by causing the floor panel to protrude upward or downward in order to generate 2×1 mode or 2×2 mode vibration in the floor panel in a frequency band that nearly matches the tire cavity resonance frequency.

7 Claims, 7 Drawing Sheets

1 × 2 MODE (A)

2 × 2 MODE (B)

(a)

(b)

(c)

AUTOMOTIVE FLOOR PANEL STRUCTURE

BACKGROUND OF THE INVENTION

1. Field of the Invention

The present invention relates to the floor panel structure of a car body and particularly to the floor panel structure of a car body where the floor of an automobile consists of floor panels provided connected to frame members of the car body.

2. Conventional Art

Vibration from frame members linked to the engine or suspension is known to be transmitted to floor panels, causing these floor panels to vibrate and as a result, the air within the passenger cabin vibrates greatly, thus generating unpleasant in-cabin vibrations and noise.

In this case, the source of vibration causing the problem may be vibration from the engine itself or road noise transmitted from the suspension, while this road noise typically includes components due to resonance of the tire cavity and components due to resonance of the suspension.

Typical measures conventionally taken to suppress this vibration and noise include applying vibration-damping materials and vibration-suppressing materials as various vibration-damping and vibration suppression measures. While it is possible to reduce vibration and noise in this manner, an extremely large amount of vibration-damping material and vibration-suppressing material is required, thus increasing the vehicle weight and leading to various deleterious effects and becoming a major problem on the cost side.

Moreover, the unpleasant vibration transmitted from the engine and suspension is mainly below 400 Hz in an automobile, and in particular, has a peak at a frequency near the 250 Hz which is road noise arising from tire cavity resonance. Thus, a technique is known by which a plurality of beads is formed in the floor panels, thus increasing the panel thickness and raising its rigidity, thereby shifting the natural frequency of the floor panel to a high band higher than 400 Hz. Specifically, an attempt is made to prevent the floor panel from resonating at the resonance frequency of the suspension and the tire cavity resonance frequency band, thus reducing unpleasant vibration and noise.

In this case, while this has the advantage of being able to suppress resonance peaks in low-frequency regions, vibration in the high-pitched regions conversely increases, so it becomes necessary to use large amounts of vibration-damping materials and vibration-suppressing materials in order to suppress vibration and noise in the high-frequency regions. In this manner, even in this case, the vehicle weight is increased as described above so there are various deleterious effects and problems on the cost side, so it is desirable to solve this problem.

Thus, the present inventors focused on the relationship between the vibration frequencies and vibration modes of vibrations transmitted to the floor panel and proposed a structure of a floor panel wherein the acoustic emission levels at specific vibration frequencies (resonance regions) become even smaller vibration modes (Publication of unexamined Japanese patent application (Kokai) No. JP-A-9-202269). This floor panel structure is one wherein the specific frequencies are frequencies near the 250 Hz of road noise arising from the tire cavity resonance transmitted to the floor panel as the most unpleasant vibration, and so the rigidity of the floor panel is partially adjusted so that the vibration mode of the floor panel becomes a vibration mode such as a 2×2 mode or 2×1 mode where an even number of vibration antinodes is generated. In this manner, an even number of vibration antinodes is generated and thus with a setup where the sound waves radiated from the respective vibration antinodes cancel each other, it is possible to reduce the acoustic emission efficiency and reduce noise within the cabin.

However, in the case in which vibration-damping materials and vibration-suppressing materials are attached to the entire surface of the floor panel as described above, there are problems of increased materials costs and increased vehicle weight. In addition, if the panel thickness is increased, there is also a problem of increased vehicle weight.

In addition, the floor panel structure recited in Kokai No. JP-A-9-202269 is effective in reducing noise in a specific frequency band, for example the frequency band near 250 Hz which is road noise caused by tire cavity resonance. However, if there is the generation of 1×1 mode with a single antinode of vibration that have a high acoustic emission efficiency in frequency bands outside the frequency band near 250 Hz, particularly in the frequency band near 160 Hz, then even if noise in the frequency band near 250 Hz which is road noise caused by tire cavity resonance is reduced, the problem of noise in the frequency band near 160 Hz which is road noise due to suspension resonance becoming extremely loud occurs.

Here, with the floor panel structure recited in the aforementioned Kokai No. JP-A-9-202269, circular rigidity adjusting parts are provided on the floor panel corresponding to the distribution of amplitudes of antinodes of vibration in vibration modes, or more specifically the distortion energy distribution, thus generating 2×1 mode or other vibration modes with a low acoustic emission efficiency.

Such circular rigidity adjustment parts are relatively easy to fabricate by press-forming and also it is relatively easy to adjust their size and height in order to adjust their rigidity. In addition, they must be adjusted so that 2×1 mode or other vibration modes with a low acoustic emission efficiency are generated in the frequency band near 250 Hz and also so that 1×1 mode with a high acoustic emission efficiency are not generated in the frequency band near 160 Hz.

However, exhaust pipes, seats and the like are disposed below or above the floor panel in the car body, so when adjusting the rigidity, the height of the rigidity adjusting parts must be kept low enough so as not to interfere with them. In addition, they must be kept below a certain height in order to maintain sufficient legroom for passengers. In addition, the rigidity adjusting parts must be given sizes and heights such that they can be fabricated by press-forming. Moreover, the rigidity adjusting parts must be of such a size that they fit within the floor panels of a fixed shape and size that are enclosed by frame members. Specifically, because of such machining limitations and limitations from the standpoint of the car body structure, the size and height and other aspects of the circular rigidity adjusting parts must be adjusted within a predetermined range in order to adjust the rigidity of the rigidity adjusting parts.

For this reason, with this adjustment within the predetermined range, there are cases in which it is not possible to prevent 1×1 mode vibrations from being generated in the frequency band near 160 Hz, so the noise in this frequency band near 160 Hz becomes extremely loud. Thus, in order to reduce this vibration in the frequency band of road noise due to suspension resonance at the same time, it is necessary to apply vibration-damping materials to the entire surface of the floor panel, so the problem of increased car body weight arises.

In addition, in the case in which 2×1 mode or other vibration modes with low acoustic emission efficiency are generated in a specific frequency range by means of the floor panel structure recited in Kokai No. JP-A-9-202269, if the amplitude of vibration itself can be reduced, then it is possible to achieve an even further reduction in noise within the cabin.

Here, upon discovering that when the rigidity of the floor panel is partially increased differences in the shape of those portions affect the frequencies at which vibration modes are generated and the magnitude of the vibration amplitude, the inventors took note of this point and attempted to solve this problem with the conventional art.

SUMMARY OF THE INVENTION

The present invention has an object to provide the floor panel structure of a car body that is able to generate a vibration mode with a low acoustic emission efficiency in a specific frequency band (e.g., near 250 Hz) and also reduce the amplitude of their vibration, thereby greatly reducing the sound radiated from a floor panel due to vibration transmitted from the frame members of the body to the floor panels and reduce the noise within the cabin.

The present invention also has an object to provide the floor panel structure of a car body that is able to a generate vibration mode with a low acoustic emission efficiency in a specific frequency band (e.g., near 250 Hz) and also prevent the generation of a vibration mode with a high acoustic emission efficiency in a specific frequency band outside of that frequency band (e.g., near 160 Hz), thereby greatly reducing the sound radiated from a floor panel due to vibration transmitted from the frame members of the body to the floor panel and reducing the noise within the cabin.

In order to achieve the above object, the present invention provides a floor panel structure of a car body where an automobile floor has a floor panel that is connected to frame members of the car body, the floor panel comprising a vibration mode adjusting structure which generates a predetermined mode of vibration and thus suppresses the generation of acoustic emissions, the floor panel vibration mode adjusting structure having rectangular shaped rigidity adjusting parts that protrude above or below the floor panel so that 2×1 mode or 2×2 mode vibration is generated in the floor panel in a predetermined frequency band.

According to the present invention mentioned above, the floor panel vibration mode adjusting structure has rectangular shaped rigidity adjusting parts that protrude above or below the floor panel so that 2×1 mode or 2×2 mode vibration is generated in the floor panel in a predetermined frequency band. Accordingly, 2×1 mode or 2×2 mode vibration is generated in a predetermined frequency band, so the sound radiated from a floor panel due to vibration transmitted from the frame members of the body to the floor panels can be greatly reduced and reductions in the noise within the cabin can be achieved.

In addition, the rigidity adjusting areas are rectangular, so the vibration amplitude itself at the antinodes of 2×1 mode or 2×2 mode vibration can be made small, and as a result, in addition to the cancellation effect of acoustic emissions canceling each other, the acoustic emission itself can be reduced even further.

In addition, the rigidity adjusting areas are rectangular, so it is easier to define the regions in which the antinodes of vibration are generated within the vibration regions of the floor panel, and as a result, it is possible to reduce the acoustic emission efficiency greatly by giving adjacent antinodes of vibration the same vibration volumes.

In addition, the rigidity adjusting areas are rectangular, so their outside edges are linear, and thus 1×1 mode vibration is not generated as readily as when the rigidity adjusting areas are circular, or even when 1×1 vibration mode is generated, the frequency at which it is generated can be increased and made closer to the frequency at which 2×1 mode or 2×2 mode is generated.

The present invention also provide a floor panel structure of a car body where an automobile floor has a floor panel that is connected to frame members of the car body, the floor panel comprising a vibration mode adjusting structure which generates a predetermined mode of vibration and thus suppresses the generation of acoustic emissions, the floor panel vibration mode adjusting structure having rigidity adjusting parts that protrude above or below the floor panel so that 2×1 mode or 2×2 mode vibration is generated in the floor panel in a frequency band near 250 Hz, and the rigidity adjusting parts being formed in a circular shape in the case that 1×1 mode vibration can be generated in a frequency band outside those near 160 Hz, but the rigidity adjusting parts are formed in a rectangular shape in the case that 1×1 mode vibration cannot be generated in a frequency band outside those near 160 Hz.

According to the present invention mentioned above, the floor panel vibration mode adjusting structure has rigidity adjusting parts that protrude above or below the floor panel so that 2×1 mode or 2×2 mode vibration is generated in the floor panel in a frequency band near 250 Hz, and the rigidity adjusting parts are formed in a circular shape in the case that 1×1 mode vibration can be generated in a frequency band outside those near 160 Hz, but the rigidity adjusting parts are formed in a rectangular shape in the case that 1×1 mode vibration cannot be generated in a frequency band outside those near 160 Hz. Accordingly, 2×1 mode or 2×2 mode acoustic emission from the floor panel due to road noise due to tire cavity resonance in a frequency band near 250 Hz, e.g. the frequency band at 220-260 Hz, can be reduced and also, 1×1 mode acoustic emission due to road noise due to suspension resonance in a frequency band near 160 Hz, e.g. the frequency band at 120-180 Hz, can be reduced.

In addition, the rigidity adjusting parts are formed in a circular shape in the case that 1×1 mode vibration can be generated in a frequency band outside those near 160 Hz. Here, circular rigidity adjusting parts are fabricated relatively easily by press-forming, and by creating a dome-shaped bulge, bending vibration and twisting vibration can be less readily generated in the rigidity adjusting parts themselves. Accordingly, together with attempting to reduce the cost of press-forming, it is also possible to reduce acoustic vibration due to road noise due to suspension resonance in a frequency band near 160 Hz, e.g. the 120-180 Hz frequency band.

In addition, the rigidity adjusting parts are formed in a rectangular shape in the case that 1×1 mode vibration cannot be generated in a frequency band outside those near 160 Hz. Here, when the rigidity adjusting parts are formed in a rectangular shape, their outside edges are linear, and thus 1×1 mode vibration is not generated as readily as when the rigidity adjusting areas are circular, or even when 1×1 vibration mode is generated, the frequency at which it is generated can be increased and made closer to the frequencies at which 2×1 mode or 2×2 mode is generated. Accordingly, it is possible to prevent 1×1 vibration mode from being generated in the floor panel in the frequency band near 160 Hz. As a result, acoustic emission due to road noise due to suspension resonance in a frequency band near 160 Hz, e.g. the frequency band at 120-180 Hz, can be reduced.

In a preferred embodiment of the present invention, the vibration mode adjusting structure has two rectangular rigidity adjusting parts that are disposed such that one side of each of the rigidity adjusting parts is parallel to and facing the other, and also a long, thin panel portion is formed between the rigidity adjusting parts, thus generating 2×1 mode vibration.

According to the embodiment mentioned above, the vibration mode adjusting structure has two rectangular rigidity adjusting parts that are disposed such that one side of each of the rigidity adjusting parts is parallel to and facing the other, and also a long, thin panel portion is formed between the rigidity adjusting parts, thus generating 2×1 mode vibration. Accordingly, the node of vibration can be reliably generated in the long, thin panel portion, thereby defining the position of the node of vibration and also reliably generating 2×1 mode vibration. In addition, it is possible to make the 1×1 mode vibration itself less readily generated, and even if it is generated, the amplitude of vibration can be made small.

In a preferred embodiment of the present invention, the vibration mode adjusting structure has four rectangular rigidity adjusting parts that are disposed such that one side of each of the adjacent rigidity adjusting parts is parallel to and facing the other, and also long, thin panel portions are formed by the four rigidity adjusting parts such that they extend in a cross shape, thus generating 2×2 mode vibration.

According to the embodiment mentioned above, the vibration mode adjusting structure has four rectangular rigidity adjusting parts that are disposed such that one side of each of the adjacent rigidity adjusting parts is parallel to and facing the other, and also long, thin panel portions are formed by the four rigidity adjusting parts such that they extend in a cross shape, thus generating 2×2 mode vibration. Accordingly, the nodes of vibration can be reliably generated in the long, thin panel portions, so it is possible to define the positions of the nodes of vibration and also reliably generate 2×2 mode vibration. In addition, it is possible to make the 1×1 mode vibration itself less readily generated, and even if it is generated, the amplitude of vibration can be made small.

In a preferred embodiment of the present invention, the rectangular rigidity adjusting parts of the vibration mode adjusting structure have steps provided on their outside edges and protrusions provided toward the inside of these steps, while risers are provided on these steps and protrusions, and the risers of the steps are formed at angles closer to vertical than the risers of the protrusions.

According to the embodiment mentioned above, the rectangular rigidity adjusting parts of the vibration mode adjusting structure have steps provided on their outside edges and protrusions provided toward the inside of these steps, while risers are provided on these steps and protrusions, and the risers of the steps are formed at angles closer to vertical than the risers of the protrusions. Accordingly, it is possible to make 1×1 mode vibration even less readily generated than with rectangular rigidity adjusting areas that are not provided with steps, and have only of protrusions, for example, and even if they are generated, the frequency at which 1×1 mode is generated can be made closer to the frequency at which 2×1 mode or 2×2 mode is generated. As a result, it is easy to prevent 1×1 mode vibration from being generated at a frequency band near 160 Hz depending on the size and orientation of the rectangular rigidity adjusting areas, so acoustic emission from the floor panel at frequency band near 160 Hz which is road noise due to suspension resonance can be readily reduced.

In addition, the rectangular rigidity adjusting parts of the vibration mode adjusting structure have steps provided on their outside edges and protrusions provided toward the inside of these steps, while risers are provided on these steps and protrusions, and the risers of the steps are formed at angles closer to vertical than the risers of the protrusions. Accordingly, the rigidity of the entire rectangular rigidity adjusting areas can be readily increased. Here, the rectangular rigidity adjusting areas are constituted with their outside edges being linear sides, so bending vibration and twisting vibration are more readily generated in the rigidity adjusting parts themselves than in circular rigidity adjusting areas, but by increasing rigidity in this manner, it is possible to suppress the generation of bending vibration and twisting vibration of the rigidity adjusting parts themselves.

In addition, the rectangular rigidity adjusting parts of the vibration mode adjusting structure have steps provided on their outside edges and protrusions provided toward the inside of these steps, while risers are provided on these steps and protrusions, and the risers of the steps are formed at angles closer to vertical than the risers of the protrusions. Accordingly, the accuracy of forming the rigidity adjusting areas can be increased at the time of press-forming, and as a result, 2×2 mode or 2×1 mode vibration can be generated reliably in the frequency band near 250 Hz.

In a preferred embodiment of the present invention, the predetermined frequency band is a frequency band that nearly matches the tire cavity resonance frequency.

According to the embodiment mentioned above, acoustic emission from the floor panel due to vibration transmitted from the frame members of the car body to the floor panel is greatly reduced, so reductions in noise within the cabin can be achieved.

In a preferred embodiment of the present invention, the predetermined frequency band is a frequency band near 250 Hz.

According to the embodiment mentioned above, acoustic emission from the floor panel due to vibration transmitted from the frame members of the car body to the floor panel in a frequency band near 250 Hz is greatly reduced, so reductions in noise within the cabin can be achieved.

The present invention further provides a method of manufacturing a car body floor panel that is connected to frame members of the car body, thereby constituting the floor of an automobile, and that also have a vibration mode adjusting structure which generates a predetermined mode of vibration and thus suppresses the generation of acoustic emissions, where this vibration mode adjusting structure is provided with circular and/or rectangular rigidity adjusting parts, the method comprising the steps of forming circular rigidity adjusting parts in the case that 2×1 mode or 2×2 mode vibration is generated in a frequency band near 250 Hz by adjusting the dimensions of the rigidity adjusting parts within a predetermined range, and also 1×1 mode vibration can be generated in frequency band outside those near 160 Hz, and forming rectangular rigidity adjusting parts in the case that 1×1 mode vibration cannot be generated in a frequency band outside those near 160 Hz even if the dimensions of the rigidity adjusting parts are adjusted within a predetermined range.

In a preferred embodiment of the present invention, the step of forming rectangular rigidity adjusting parts includes a first step of forming rectangular rigidity adjusting parts that do not have steps in their outside edges in the case that 1×1 mode vibration is not generated or 1×1 mode vibration can be generated in a frequency band outside those near 160 Hz by adjusting the dimensions of the rectangular rigidity adjusting parts within a predetermined range, and a second step of forming rectangular rigidity adjusting parts that have steps in their outside edges in the case that 1×1 mode vibration is not generated or 1×1 mode vibration cannot be generated in a frequency band outside those near 160 Hz even if the dimensions of the rectangular rigidity adjusting parts are adjusted within a predetermined range.

According to the embodiment mentioned above, there is a first step of forming rectangular rigidity adjusting parts that do not have steps in their outside edges. Here, these rectangular rigidity adjusting parts that do not have steps in their outside edges are such that there is no need for the press-forming of steps, so the machining costs can be reduced, and moreover, it is comparatively easier to form rigidity adjusting areas of lower rigidity than with rectangular rigidity adjusting areas in which a step is provided. Accordingly, even in the case that 1×1 mode vibration occurs at a frequency lower than the frequency band near 160 Hz or other cases in which it is not desirable to make the rigidity too high, it is possible to prevent 1×1 mode vibration from occurring in the frequency band near 160 Hz.

In addition, there is a second step of forming rectangular rigidity adjusting parts that have steps in their outside edges. Accordingly, it is possible to make the generation of 1×1 mode vibration occur less readily than in rectangular rigidity adjusting parts that do not have steps in their outside edges, or even if 1×1 mode vibration is generated, the frequency at which 1×1 mode is generated can be made closer to the frequency at which 2×1 mode or 2×2 mode is generated. As a result, it is possible to prevent 1×1 mode vibration from being generated at a frequency band near 160 Hz.

According to the present invention, it is possible to greatly reduce the sound radiated from a floor panel due to vibration transmitted from the frame members of the body.

The above and other objects and features of the present invention will be apparent from the following description by taking reference with accompanying drawings employed for predetermined embodiments of the present invention.

DESCRIPTION OF THE PREFERRED EMBODIMENTS

The embodiments of the present invention will now be explained with reference to the appended drawings.

Figure 1:
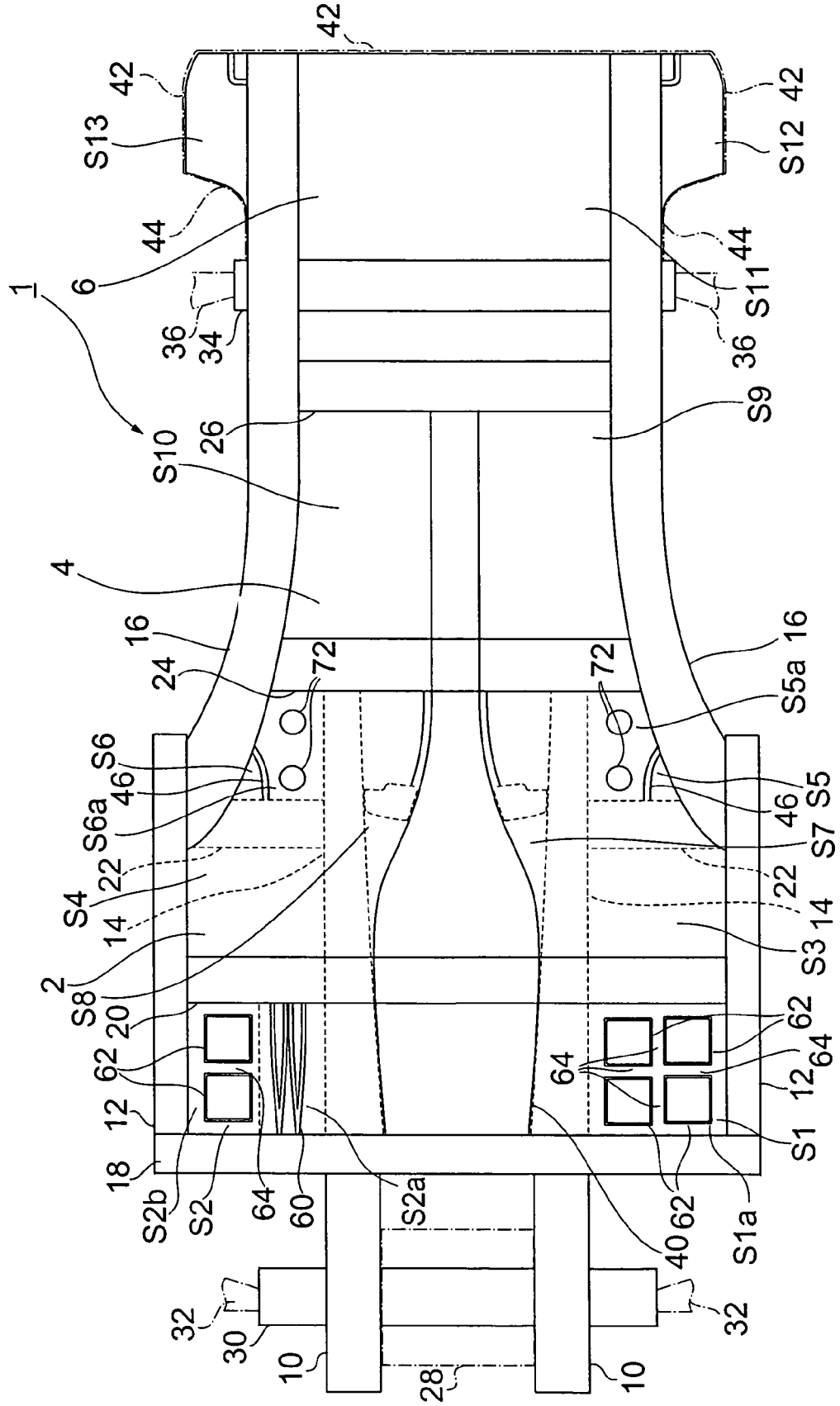
FIG. 1 is a top view of an automobile underbody provided with the floor panel structure of a car body according to an embodiment of the present invention.

FIG. 1 is a top view of an automobile underbody provided with the floor panel structure of a car body according to an embodiment of the present invention.

As shown in FIG. 1, an automobile underbody 1 consists of: a plurality of frame members (to be described later), a front floor panel 2 constituting the floor portion of the car cabin connected to these frame members, a center floor panel 4 located at a position higher than and behind this front floor panel 2 (in the car body direction), and also a rear floor panel 6 constituting the floor portion of the trunk located at a position higher than and behind this center floor panel 4 (in the car body direction).

The frame members are the front side frames 10, side sills 12, floor side frames 14, rear side frames 16, No. 1 cross member 18, No. 2 cross member 20, sub-cross member 22, No. 3 cross member 24 and No. 4 cross member 26.

Here follows a detailed description of the frame members made with reference to FIG. 1. The side sills 12 with a closed cross-sectional structure that serve as reinforcing members in the car lengthwise direction extend in the car lengthwise direction on both sides of the automobile underbody 1 in the car crosswise direction. The rear ends of these side sills 12 are joined to the No. 1 cross member 18 which is a reinforcing member in the car crosswise direction. Moreover, between the side sills 21 is provided a pair of floor side frames 14 each with a closed cross-sectional structure such that it extends in the car body lengthwise direction.

The front ends of these floor side frames 14 are joined to a pair of front side frames 10 provided such that they enclose the left and right sides of the engine compartment. An engine 28 and front suspension cross member 30 are attached to these front side frames 10, and a front suspension 32 is attached to this front suspension cross member 30.

In addition, rear side frames 16 with a closed cross-sectional structure extending in the car body lengthwise direction are joined to the rear ends of each of the side sills 12 on the inside in the car crosswise direction, and a rear suspension cross member 34 is attached to these rear side frames 16 and the rear suspension 36 is attached to this rear suspension cross member 34.

As reinforcing members in the car crosswise direction, in addition to the No. 1 cross member 18 described above, there are also provided a No. 2 cross member 20 extending in the car crosswise direction, sub-cross member 22, No. 3 cross member 24 and a No. 4 cross member 26.

The left and right ends of the No. 2 cross member 20 are joined to the respective side sills 21. The inside ends in the car crosswise direction of the sub-cross member 22 are joined to the floor side frames 14, and the outside ends in the car crosswise direction are joined to the rear side frames 16. The left and right ends of the No. 3 cross member 24 are joined to the respective rear side frames 16, and the rear ends of the aforementioned floor side frames 14 are joined to this No. 3 cross member 24. The left and right ends of the No. 4 cross member 26 are joined to the rear side frames 16.

In this manner, the floor panels 2, 4 and 6 are provided with a reinforcing structure in the car body lengthwise direction consisting of the side sills 12 on the left and right edges, a pair of floor side frames 14 and a pair of rear side frames 16. In addition, a reinforcing structure in the car crosswise direction consisting of the No. 1 cross member 18, No. 2 cross member 20, sub-cross member 22, No. 3 cross member 24 and No. 4 cross member 26 is provided. By means of these frame members, the automobile body can be given adequate bending rigidity and torsion rigidity and also, deformation of the cabin particularly in an automobile head-on collision can be minimized so that the passengers can be protected reliably.

Here follows a detailed description of the frame members made with reference to FIG. 1. The front floor panel 2 is press-formed from steel sheet as a unit, having a floor tunnel 40 which bulges upward at a position roughly in the center of the car in the car crosswise direction and extends in the car body lengthwise direction. This floor tunnel 40 extends to the car-body rear edge of the center floor panel 4.

The front floor panel 2 is made up of eight floor panels S1-S8, each surrounded by the side sills 12 each extending in the car body lengthwise direction at both sides in the car crosswise direction, the floor side frames 14, rear side frames 16 and floor tunnel 40, along with the various cross members 18, 20, 22 and 24 each extending in the car crosswise direction.

Floor panel sections S1 and S2 constitute portions of the front floor panel 2 which is formed as a unit, being provided on the left and right sides of the floor tunnel 40, within spaces surrounded by the respective frame members consisting of the side sills 12, the floor side frames 14, No. 1 cross member 18 and No. 2 cross member 20. The floor panel sections S1 and S2 have their peripheral edges joined to the frame members 12, 14, 18 and 20.

Floor panel sections S3 and S4 constitute portions of the front floor panel 2 which is formed as a unit, being provided on the left and right sides of the floor tunnel 40, within spaces surrounded by the respective frame members consisting of the side sills 12, the floor side frames 14, No. 2 cross member 20 and sub-cross member 22. The floor panel sections S3 and S4 have their peripheral edges joined to the frame members 12, 14, 20 and 22.

Floor panel sections S5 and S6 constitute portions of the front floor panel 2 which is formed as a unit, being provided on the left and right sides of the floor tunnel 40, within spaces surrounded by the respective frame members consisting of the rear side frames 16, the floor side frames 14, sub-cross member 22 and No. 3 cross member 24. The floor panel sections S5 and S6 have their peripheral edges joined to the frame members 14, 16, 22 and 24.

Floor panel sections S7 and S8 constitute portions of the front floor panel 2 which is formed as a unit, being provided on the left and right sides of the floor tunnel 40, within spaces surrounded by the floor tunnel 40 along with the frame members which are the floor side frames 14 and No. 3 cross member 24. The floor panel sections S7 and S8 have their outside edges joined on two sides to the frame members 14 and 24.

The center floor panel 4 is press-formed from steel sheet as a unit, having a floor tunnel 40 which bulges upward at a position roughly in the center of the car in the car crosswise direction and extends in the car body lengthwise direction. This center floor panel 4 is made up of floor panel sections S9 and S10, being provided on the left and right sides of the floor tunnel 40, within spaces surrounded by the floor tunnel 40 along with the frame members which are the rear side frames 16, No. 3 cross member 24 and No. 4 cross member 26, with their outside edges joined on three sides to the frame members 16, 24 and 26.

The rear floor panel 6 is press-formed from steel sheet as a unit, being made up of a floor panel section S11 surrounded by frame members which are the rear side frames 16 and the No. 4 cross member 26, and the rear body 42 which is a body structural member, along with, on both sides in the car crosswise direction, floor panel sections S12 and S13 which are surrounded by frame members which are the rear side frames 16, and the rear body 42 which is a body structural member. The floor panel section S11 has its peripheral edges joined to the frame members 16 and 26 and the rear body 42, while floor panel sections S12 and S13 have their peripheral edges joined to frame member 16, the rear body 42 and wheel housing 44.

With such an automobile underbody 1, the vibration and road noise from the engine 28, front suspension 32 and rear suspension 36 are transmitted through the front side frames 10, front suspension cross member 30 and rear suspension cross member 34, respectively, to the respective frame members 12, 14, 16, 18, 20, 22, 24 and 26 linked thereto, so the vibration and road noise are transmitted to the floor panel sections S1-S13.

As described above, the vibrations transmitted to the frame members from the engine and suspension are mainly in the frequency band near 250 Hz which is the cavity resonance frequency of the tires and the frequency band near 160 Hz which is road noise due to resonance of the suspension. Thus, in this embodiment, by providing the floor panel sections S1, S2, S5 and S6 with vibration mode adjusting structures, acoustic emission in the frequency band near 250 Hz from the floor panel sections S1, S2, S5 and S6 due to vibration transmitted by the frame members 12, 14, 16, 18, 20, 22, 24 and 26 is suppressed, and also, acoustic emission in the frequency band near 160 Hz which is road noise due to resonance of the suspension is suppressed. Note that floor panel sections S3, S4, and S7 through S13 consist of conventional flat panels.

Figure 2:
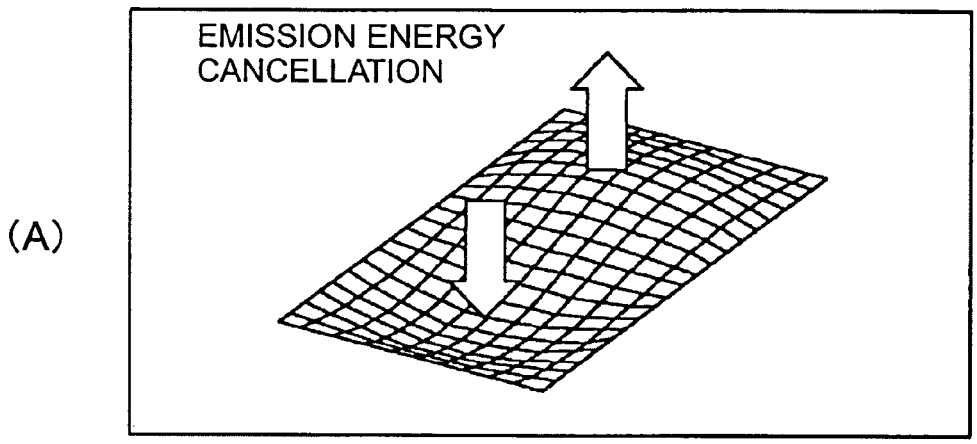
FIG. 2 is a schematic drawing illustrating the cancellation of sound emitted by the floor panel with a vibration mode adjusting structure.
Figure 2:
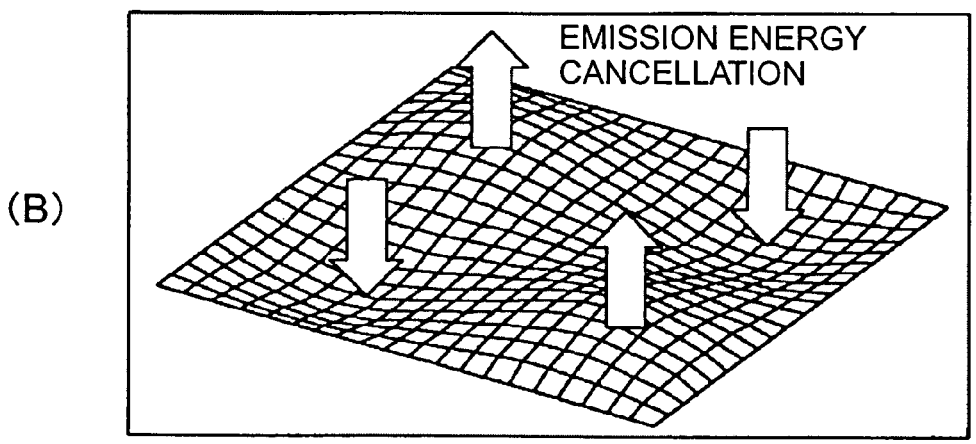
Figure 3:
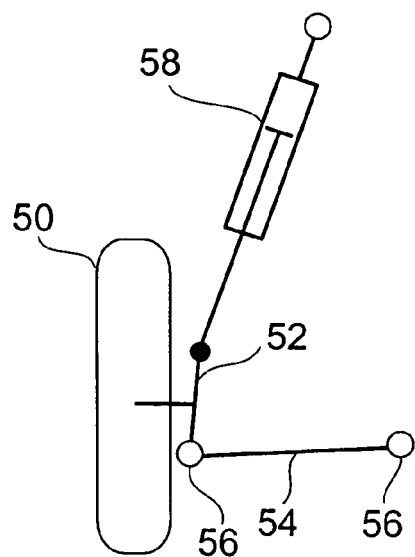
FIG. 3 is a schematic diagram of a strut-type suspension.
Figure 4:
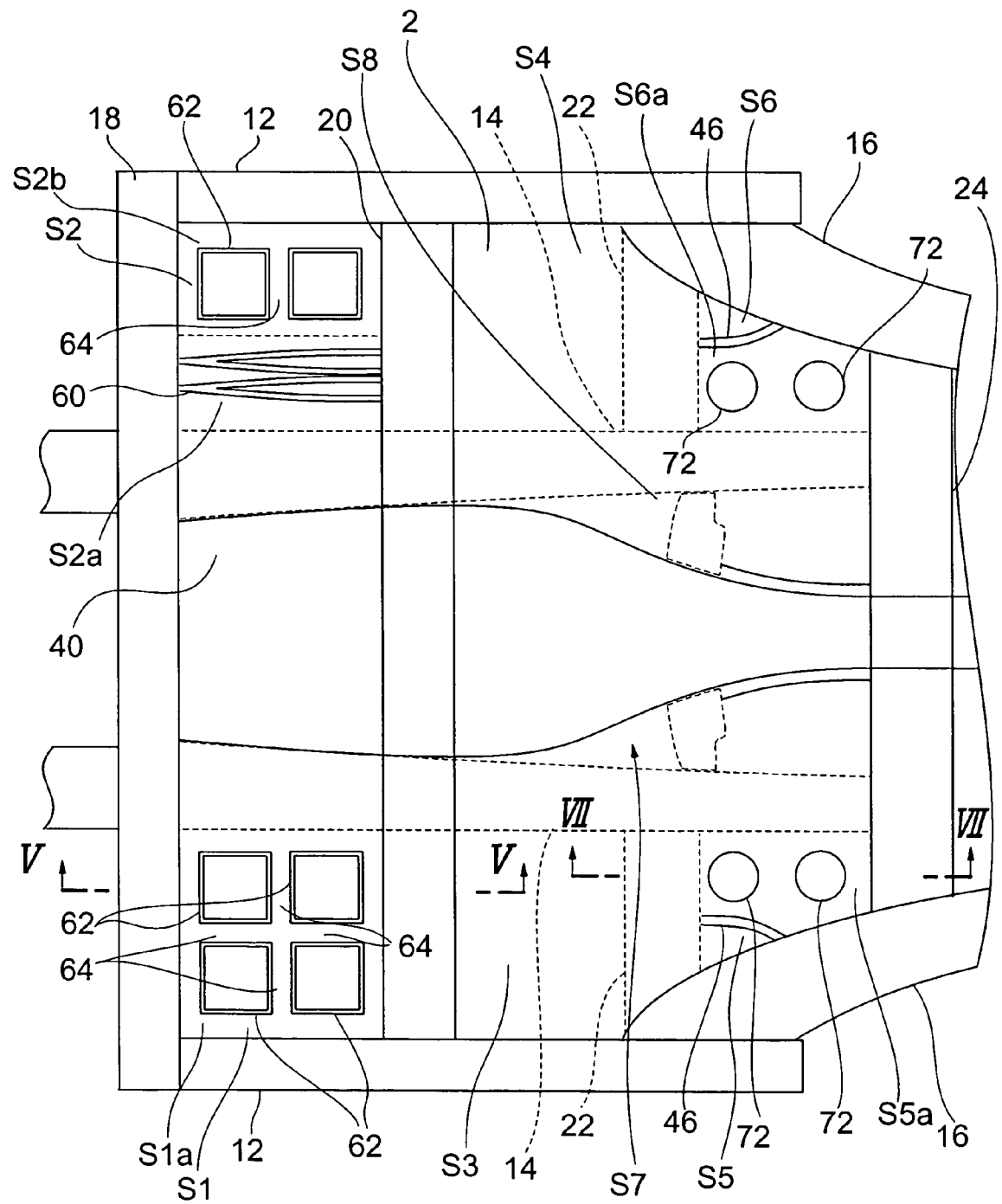
FIG. 4 is an enlarged top view of front floor panel 2 that has the car body floor panel structure according to an embodiment of the present invention.
Figure 5:
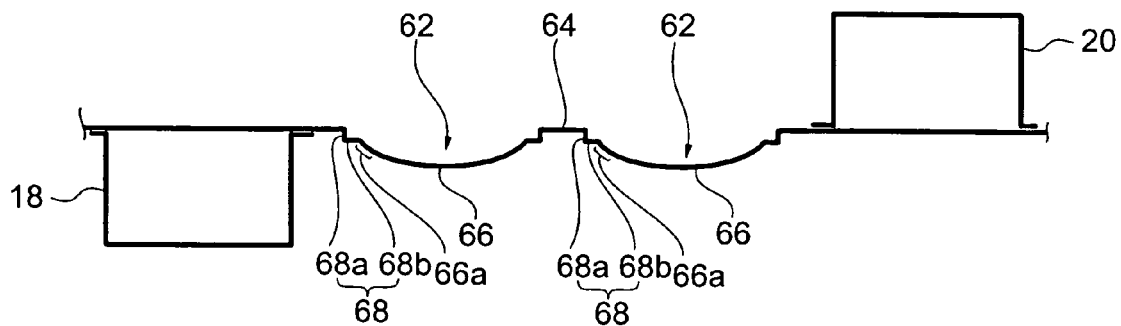
FIG. 5 is a cross section along V-V of FIG. 4.

Here follows a detailed description of the car body floor panel structure according to this embodiment, made with reference to FIGS. 2-5. FIG. 2 is a schematic drawing illustrating the cancellation of sound emitted by the floor panel with a vibration mode adjusting structure; FIG. 3 is a schematic diagram of a strut-type suspension; FIG. 4 is an enlarged top view of front floor panel 2 of this embodiment; and FIG. 5 is a cross section along V-V of FIG. 4.

The vibration mode adjusting structure in the car body floor panel structure according to this embodiment is one wherein the floor panel is made to vibrate at a predetermined frequency in predetermined vibration modes having low acoustic emission efficiencies.

The basic theory of this vibration mode adjusting structure is described in detail in the aforementioned in the aforementioned Kokai No. JP-A-9-202269. In short, taking n and m to be the number of antinodes of a standing wave generated in the lengthwise and crosswise directions, respectively, of a rectangular region, as illustrated in the examples shown in FIG. 2, if "n×m=even number" is true, then acoustic emissions from adjacent portions in opposite phases within the panel in question cancel each other, so the acoustic emission energy is greatly decreased.

In contrast, in 1×1 vibration mode wherein one antinode of vibration is generated in the vibration region, the acoustic emission efficiency becomes great because there are no portions vibrating in opposite phases.

Acoustic emission from the floor panels is generated by road noise and engine or suspension vibration transmitted from the frame members 12, 14, 16, 18, 20, 22, 24 and 26 as described above. In this embodiment, vibration mode adjusting structures are provided in the floor panel sections S1, S2, S5 and S6, so acoustic emissions due to the tire cavity resonance frequencies that appear in a frequency band mainly near 250 Hz are reduced by the vibration mode adjusting structure. In this embodiment, as such a frequency band, the frequency band at 220-260 Hz is set as the target value for reducing acoustic emission.

In addition, in floor panel sections S1, S2, S5 and S6, 1×1 vibration mode are prevented from occurring in the frequency band near 160 Hz which is a problem in vehicles that have strut suspensions, thus reducing acoustic emission due to road noise due to suspension resonance. In this embodiment, as such a frequency band, the frequency band at 120-180 Hz is set as the setting target value for reducing acoustic emission. The frequency band (setting target) of vibration occurring due to suspension resonance differs depending on the type of suspension, so the setting target becomes a different value in the case of a suspension of another type such as the double wishbone.

FIG. 3 is a schematic drawing illustrating a strut-type suspension. The bottom end of the knuckle/spindle 52 of the front wheel 50 is linked to a suspension arm 54 at a ball joint 56, and the bottom end of the shock absorber 58 is joined rigidly to the top end of the knuckle/spindle 52 (the joint is represented by a black circle). Note that the top end of the shock absorber 58 is coupled to the tire housing.

First, the car body floor panel structure of floor panel sections S1 and S2 according to this embodiment will be described with reference to FIGS. 4 and 5.

As shown in FIG. 4, the floor panel sections S1 and S2 have their four sides surrounded by the side sills 12, floor side frame 14, No. 1 cross member 18 and the No. 2 cross member 20. The vibration region S1a surrounded by floor panel section S1 is roughly square in shape and made so that it readily generates 2×2 mode vibration. In addition, floor panel section S2 is provided with a reinforcing bead 60 for maintaining the strength of the floor panel, and the region S2a where this reinforcing bead 60 is provided, namely the region in FIG. 4 surrounded by a broken line and the frame members 14, 18 and 20, is made so that specific vibration modes are not readily generated. However, the remaining vibration region S2b, namely the region in FIG. 4 surrounded by a broken line and the frame members 12, 18 and 20 has a rectangular shape of a size roughly 2×1, so vibration mode of the 2×1 mode are readily caused to occur.

In vibration region S1a of floor panel section S1, four roughly square rigidity adjusting parts 62 for partially adjusting the rigidity of the floor panel section S1 are formed aligned in the car body lengthwise direction and car crosswise direction to match the shape of the vibration region S1a in order for 2×2 mode vibrations to be generated in the frequency band near 250 Hz and also prevent 1×1 mode vibration from being generated in the frequency band near 160 Hz.

In vibration region S2a of floor panel section S2, two roughly square rigidity adjusting parts 62 for partially adjusting the rigidity of the floor panel section S2 are formed aligned in the car body lengthwise direction in order for 2×1 mode vibrations to be generated in the frequency band near 250 Hz and also prevent 1×1 mode vibration from being generated in the frequency band near 160 Hz.

These rigidity adjusting areas 62 are roughly square in shape and are also formed so as to occupy a relatively large surface area within the vibration regions S1a and S2b, and the portion in which rigidity adjusting areas 62 are provided are the portions in which the antinodes of 2×2 mode and 2×1 mode vibrations are generated. Specifically, the rigidity adjusting areas 62 define the regions in which the antinodes of 2×2 mode and 2×1 mode vibrations are generated. Each of these rigidity adjusting parts 62 is formed to be roughly the same size, so that the vibration volumes of the four or two antinodes of vibration become the same.

In addition, these nearly square rigidity adjusting areas 62 are disposed such that one side of each of the rigidity adjusting parts is parallel to and facing the other, and also linear long, thin, flat panel portions 64 are formed between these rigidity adjusting parts. Specifically, in floor panel section S1, the four rigidity adjusting areas 62 form long, thin, flat panel portions 64 that extend linearly with a roughly constant width, crossing near the center of the vibration region S1a and forming a cross shape. Long, thin, flat panel portions 64 that extend linearly with a roughly constant width are formed in floor panel section S2 in a direction nearly perpendicular to the lengthwise direction of the rectangular vibration region S2b and roughly in the middle in the lengthwise direction.

In this manner, in this embodiment, since the rigidity adjusting areas 62 form linear long, thin, flat panel portions 64, the nodes of vibration are generated in the panel portions 64 between adjacent rigidity adjusting areas 62.

Note that the shapes of the rigidity adjusting areas need not necessarily be square as described above, but rather they may also be rectangular, and in this case, it is sufficient that they are disposed such that one side of each of the rigidity adjusting parts is parallel to and facing the other, and also linear long, thin, flat panel portions 64 are formed between these rigidity adjusting parts.

Next, as shown in FIG. 5, these rigidity adjusting areas 62 in panel sections S1 and S2 are formed by causing the floor panel section S1 or S2 itself to protrude downward, with a cross section consisting of a high-rigidity curved-surface portion (protrusion) 66 with a continuously varying curvature, and a step 68 formed in its outside edge. This step 68 increases the rigidity of the rigidity adjusting area 62. This step 68 consists of a vertical part (riser) 68a and a horizontal part 68b that extends inward from the bottom edge of the vertical part 68a, while the curved-surface portion 66 is provided with a riser 66a in the vicinity of the step 68.

The rigidity adjusting areas 62 are formed with the risers 68a of the steps 68 formed at angles closer to vertical than the risers 66a of the protrusions 66, and the risers 68a of the steps 68 are bent at a sharp angle from the flat panel portion, so namely, the directions normal to the flat panel portions and vertical parts 68a become discontinuous.

Here, as described above, because of machining limitations and limitations from the standpoint of the car body structure, the height of the rigidity adjusting areas 62 must be adjusted within a predetermined range. When such limitations are present, if the rigidity adjusting areas consist solely of curved-surface portions (protrusions) 66 without providing steps 68, then the angle at which the curved-surface portion (protrusion) extends inward from the flat panel portion, namely, the angle of the riser of the curved-surface portion (protrusion) with respect to the flat panel portion cannot be made large, so the rigidity cannot be increased to the desired level.

Thus, in this embodiment, a step 68 is provided and the riser 68a of this step 68 is formed at an angle closer to vertical than the riser 66a of the protrusion 66, thus increasing the rigidity and increasing the press-forming accuracy. This angle of the vertical part (riser) may be any angle as long as it gives the desired rigidity and permits the press-forming accuracy of the rigidity adjusting areas to be increased, with the angle being determined appropriately depending on the thickness of the floor panel.

Note that the rigidity adjusting areas 62 may also protrude upward, but in this case also, it is best for the riser 68*a* of the step 68 to be formed at an angle closer to vertical than the riser 66*a* of the protrusion 66. In addition, the curved-surface portion (protrusion) 66 need not necessarily have continuously variable curvature, but rather it may also have a bent portion or bead or the like formed therein.

The rigidity of the rigidity adjusting areas 62 is adjusted by adjusting the curvature and height of the curved-surface portion 66, the height of the vertical part 68*a* of the step 68 and the width of the horizontal part 68*b*. By adjusting the rigidity of the rigidity adjusting areas 62 in this manner, the rigidity of the floor panel sections S1 and S2 are partially adjusted so that 2×2 and 2×1 vibration mode are generated in the floor panel sections S1 and S2, respectively, and also 1×1 vibration mode are not generated in the frequency band near 160 Hz.

In addition, in this embodiment, the vertical parts 68*a* of the steps 68 of the rigidity adjusting areas 62 are made to rise nearly vertically from the flat floor panel surface, thus increasing the press-forming accuracy of the rigidity adjusting areas 62 and reducing the dispersion in the magnitude of the rigidity of the rigidity adjusting areas 62.

Figure 6:
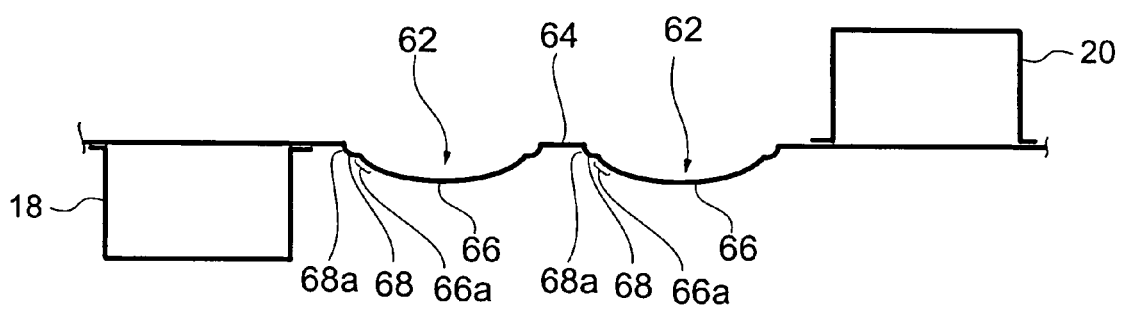
FIG. 6 is a cross section illustrating the rectangular rigidity adjusting areas according to Variations 1-3 of an embodiment of the present invention.
Figure 6:
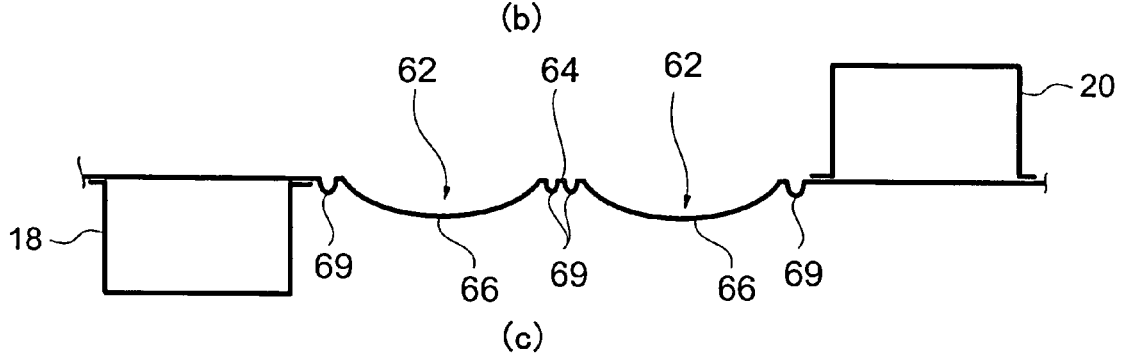
Figure 6:
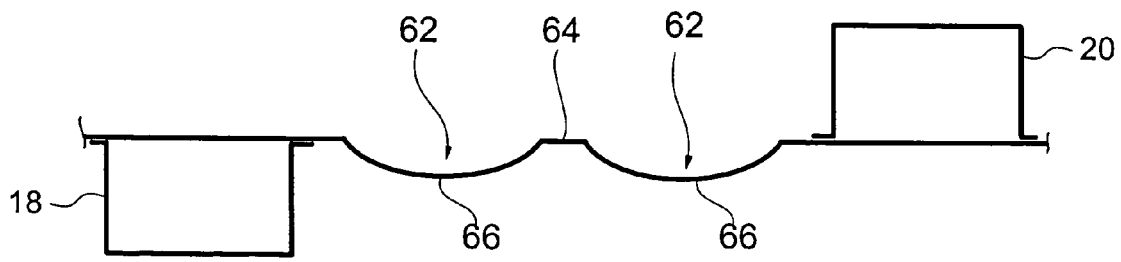

Here follows a description of Variations 1-3 of the aforementioned rigidity adjusting areas 62. FIG. 6 is a cross section illustrating the rectangular rigidity adjusting areas according to Variations 1-3 of an embodiment of the present invention.

In Variation 1 shown in FIG. 6(*a*), the aforementioned step 68 is arc-shaped. In this case also, it is best for the riser 68*a* of the step 68 to be formed at an angle closer to vertical than the riser 66*a* of the protrusion 66.

In Variation 2 shown in FIG. 6(*b*), a bead 69 is formed instead of the aforementioned step 68. This bead 69 is disposed adjacent to the curved-surface portion 66 and extending to its periphery in order to function like the step 68. This bead 69 and the curved-surface portion 66 constitute the rigidity adjusting area.

In addition, it is also possible to provide no step in the rigidity adjusting area 62 as in Variation 3 shown in FIG. 6(*c*). In this case, there is no need for press-forming of the step, so the machining cost can be reduced. In addition, in this case, it is relatively easy to form the rigidity adjusting area such that the rigidity becomes less than that of a rectangular rigidity adjusting area provided with a step. Accordingly, if one does not wish to make the rigidity too high such as in the case in which 1×1 mode vibration is generated at frequencies lower than the frequency band near 160 Hz, it becomes easier to adjust the dimensions of the rigidity adjusting areas so as to prevent 1×1 vibration mode from being generated in the frequency band near 160 Hz.

Here follows a description of the meritorious effects and function of the vibration mode adjusting structure provided on the floor panel sections S1 and S2 according to this embodiment.

In floor panel sections S1 and S2 of the floor panel structure of this embodiment, 2×1 or 2×2 vibration mode with low acoustic emission efficiency in the frequency band near 250 Hz which is road noise due to tire cavity resonance can be generated in floor panel sections S1 and S2 and also the amplitude of vibration itself can be reduced, thus reducing acoustic emission from the vibration region. Moreover, it is possible to prevent the generation of 1×1 vibration mode with a high acoustic emission efficiency in the frequency band near 160 Hz which is road noise due to suspension resonance, thus also reducing acoustic emission in that frequency band. This is described in detail below.

First, here follows a description of the effect of the vibration mode adjusting structure according to the present invention in reducing acoustic emission generated by road noise due to tire cavity resonance.

In the floor panel sections S1 and S2 with the floor panel structure according to this embodiment, the rectangular rigidity adjusting areas 62 are formed aligned to match the shape of the vibration regions S1*a* and S2*b*, so 2×2 mode or 2×1 mode vibrations are generated in the frequency band near 250 Hz which nearly agrees with the tire cavity resonance frequency and also the vibration volumes of the four or two antinodes of vibration are made to be the same, and thus it is possible to reduce acoustic emission from these vibration regions.

In particular, the rigidity adjusting areas 62 are formed so as to be rectangular, and thus the portion of the region in which antinodes of vibration are generated can be readily defined. As a result, it is easy to make adjustments so that the vibration volumes of adjacent antinodes of vibration are made identical, so the acoustic emission cancellation effect due to even numbers of nodes of vibration that vibrate in opposite phases can be reliably achieved, and thus the acoustic emission efficiency can be greatly reduced.

In addition, the rigidity adjusting areas 62 are formed so as to be rectangular, and so it is possible to reduce the amplitude of vibration itself of 2×2 mode or 2×1 mode vibrations generated in the frequency band near 250 Hz, and as a result, it is possible to further reduce acoustic emission from the vibration regions S1*a* and S2*b*.

Moreover, the rigidity adjusting areas 62 are formed so as to be rectangular, and also linear long, thin, flat panel portions 64 are formed between adjacent rigidity adjusting areas 62, so the nodes of vibration can be reliably generated in these panel portions 64 and also the positions at which the nodes of vibration are generated can be defined, and as a result, it is possible to reliably generate 2×2 mode or 2×1 mode vibrations wherein the vibration volumes of the four or two antinodes of vibration are the same.

Next, here follows a description of the effect of the vibration mode adjusting structure according to the present invention in reducing acoustic emission generated by road noise due to suspension resonance.

In the floor panel sections S1 and S2 with the floor panel structure according to this embodiment, the rigidity adjusting areas 62 are formed so as to be rectangular, so 1×1 mode vibration is not generated as readily as when the rigidity adjusting areas are formed so as to be circular.

Here, when 1×1 vibration mode which have a single antinode of vibration are generated, the antinode of vibration tends to be distributed so that the cross section forms a sine curve or other shape such that it bulges up large with a curved surface within the vibration region of the floor panel.

However, the amount by which the rigidity of the floor panel is adjusted by means of the two or four rigidity adjusting parts so as to cause 2×1 or 2×2 vibration mode to be generated in the frequency band near 250 Hz that nearly matches the tire cavity resonance frequency is roughly the same level regardless of whether the rigidity adjusting areas are circular or rectangular.

However, if vibration of the frequency generated by 1×1 mode vibration is transmitted from the frame members, then if the rigidity adjusting areas are formed so as to be circular, the 1×1 mode vibration is readily generated in a smooth curved-surface distribution along the circumference of the circular rigidity adjusting areas. In addition, even in regions in which the two rigidity adjusting areas that are near the center of an antinode of vibration with a large amplitude face each other, the outside edges are formed in the shape of a circle, so the generation of 1×1 mode vibration is not greatly suppressed with respect to the antinodes of vibration that attempt to bulge up in a curved surface.

On the other hand, if the rigidity adjusting areas are formed such that they are rectangular, when vibration of a frequency that generates 1×1 mode vibration is transmitted from the frame members, the outer edges of the rigidity adjusting areas are formed linearly in the periphery of the regions where antinodes of 1×1 mode vibration attempt to spawn, so in response to vibrations that attempt to bulge up in a curved surface, the deformation due to such vibrations does not readily arise. In addition, even in regions in which the two rigidity adjusting areas that are near the center of an antinode of vibration with a large amplitude face each other, the linear outside edges of the two rigidity adjusting areas face each other circle, so curved-surface deformation due to 1×1 mode vibration does not readily occur. As a result, it is possible to suppress the generation of 1×1 mode vibration.

In addition, even in the case that 1×1 mode vibration is generated, with the rectangular rigidity adjusting areas 62 that have linear outside edges, the frequency at which it occurs becomes higher than in the case in which the rigidity adjusting areas 62 are circular. Accordingly, the frequency band in which 2×1 or 2×2 vibration mode are generated can be made closer to the frequency band near 250 Hz in the floor panel sections S1 and S2 according to this embodiment.

As a result, even in the case in which the size and height and other dimensions of the circular rigidity adjusting areas cannot be adjusted within the predetermined range due to machining limitations or limitations from the standpoint of the car body structure, so the 1×1 mode vibration cannot be caused to be generated at frequencies outside the frequency band near 160 Hz, by forming the rigidity adjusting areas so as to be rectangular, the generation of 1×1 mode vibration in the frequency band near 160 Hz can be prevented. As a result, it is possible to reduce acoustic emission in the frequency band near 160 Hz which is road noise due to suspension resonance.

In addition, the rigidity adjusting areas 62 are disposed such that linear long, thin, flat panel portions 64 are formed between the respective adjacent rigidity adjusting areas 62, so it is possible to make 1×1 mode vibration themselves not readily generated, or even if they are generated, their vibration amplitude can be made small. In floor panel section S1 in particular, the four rectangular rigidity adjusting areas 62 are arranged so as to form cross-shaped linear long, thin, flat panel portions 64, so the generation of 1×1 vibration mode can be effectively suppressed by this arrangement.

Next, in the floor panel sections S1 and S2 with the floor panel structure according to this embodiment, a step 68 is provided at the outside edge of the curved-surface portion 66 of the rigidity adjusting area 62, so it is possible to readily increase its rigidity in comparison to the case in which the rigidity adjusting area 62 consists solely of curved-surface portion 66. In addition, the riser 68a of the step 68 is formed at an angle closer to vertical than the riser 66a of the protrusion 66, so the rigidity of the rigidity adjusting area 62 can be increased without greatly increasing the height of the rigidity adjusting area 62.

In addition, by providing a step 68 in the outside edge of the curved-surface portion (protrusion) 66, it is possible to make the generation of 1×1 mode vibration occur less readily than in rectangular rigidity adjusting parts that do not have steps in their outside edges, or even if 1×1 mode vibration is generated, the frequencies at which 1×1 mode are generated can be made closer to the frequencies at which 2×1 or 2×2 mode are generated. As a result, it is possible to prevent 1×1 mode vibration from being generated at a frequency band near 160 Hz.

In addition, the step 68 has a vertical part 68a that rises nearly vertically from the floor panel, being formed at an angle closer to vertical than the riser of the protrusion, so the accuracy of formation of the rigidity adjusting areas 62 during press-forming can be increased. As a result, it is possible to reduce the machining dispersion in the rigidity of the rigidity adjusting areas 62, and thus reliably generate 2×2 and 2×1 vibration mode in floor panel sections S1 and S2 in the frequency band near 250 Hz.

Figure 7:
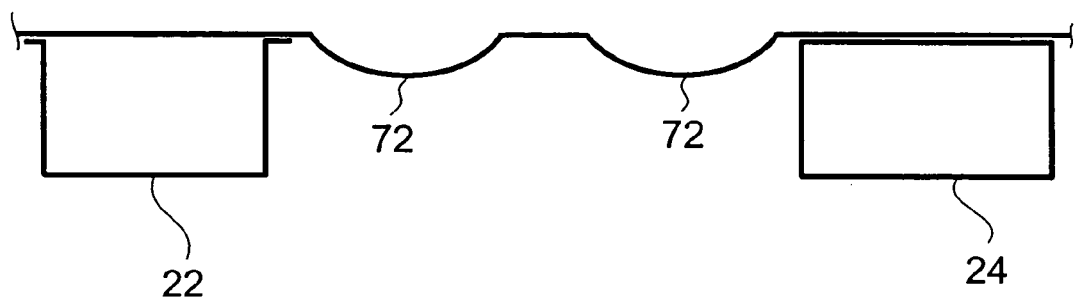
FIG. 7 is a cross section along VII-VII of FIG. 4.

Here follows a description of the car body floor panel structure of floor panel sections S5 and S6 according to this embodiment with reference to FIG. 4 and FIG. 7. FIG. 7 is a cross section along VII-VII of FIG. 4.

As shown in FIG. 4 and FIG. 7, floor panel section S5 has the edges on its four sides surrounded by a floor side frame 14, rear side frame 16, sub-cross member 22 and No. 3 cross member 24. In addition, a reinforcing bead 46 for maintaining the strength of the floor panel is provided on floor panel section S5.

As shown in FIG. 4, as the vibration mode adjusting structure within the floor panel section S5 according to this embodiment, so that 2×1 or 2×2 vibration mode with low acoustic emission efficiency in the frequency band near 250 Hz which is road noise due to tire cavity resonance are generated and also so that 1×1 vibration mode with high acoustic emission efficiency in the frequency band near 160 Hz which is road noise due to suspension resonance are not generated, two nearly circular rigidity adjusting areas 72 are formed aligned in the car lengthwise direction to match the shape of the vibration region S5a.

As shown in FIG. 4 and FIG. 6, these rigidity adjusting areas 72 are formed such that their periphery is nearly circular, being formed by causing the floor panel section S5 to protrude downward in a dome shape.

In the floor panel section S5 according to this embodiment, in vibration region S5a, so that 2×1 or 2×2 vibration mode are generated in the frequency band near 250 Hz and also so that 1×1 vibration mode in the frequency band near 160 Hz are not generated, the diameter, dome curvature and height of the nearly circular rigidity adjusting areas 72 are adjusted and also their arrangement are adjusted. In addition, by means of this adjustment, the vibration volumes of the two antinodes of 2×1 mode vibration are made the same.

In the same manner as in floor panel section S5, floor panel section S6 also has two rigidity adjusting areas 72 provided in a vibration region S6a which is a region surrounded by a floor side frame 14, rear side frame 16, sub-cross member 22 and No. 3 cross member 24.

Here follows a description of the meritorious effects and function of the vibration mode adjusting structure provided on the floor panel sections S5 and S6 according to this embodiment.

By providing nearly circular rigidity adjusting areas 72, which are the vibration mode adjusting structures, in the respective vibration regions S5a and S6a of floor panel sections S5 and S6, it is possible to cause 2×1 mode vibration to be generated in the frequency band near 250 Hz that nearly matches the tire cavity resonance frequency and also make the vibration volume of the two antinodes of vibration the same, thereby reducing acoustic emission from this vibration region.

In addition, in these vibration regions S5a and S6a, the shape of the rigidity adjusting areas may be selected to be circular rather than rectangular depending on unique conditions such as the size, shape and thickness of the vibration regions S5a and S6a, so it is possible to prevent the generation of 1×1 vibration mode with a high acoustic emission efficiency in the frequency band near 160 Hz which is road noise due to suspension resonance.

Specifically, because of differences in their shape and rigidity, the circular rigidity adjusting areas can prevent the frequency at which 1×1 vibration mode are generated from being much higher than that of rectangular rigidity adjusting areas. Accordingly, in the event that 1×1 vibration mode are generated in a completely flat floor panel in a frequency band lower than the frequency band near 160 Hz, for example, then the circular rigidity adjusting areas may be selected instead of rectangular rigidity adjusting areas, thereby preventing the frequency at which 1×1 vibration mode are generated from becoming too high, thereby preventing 1×1 vibration mode with a high acoustic emission efficiency from being generated in the frequency band near 160 Hz.

As a result, it is possible to reduce acoustic emission not only in the frequency band near 250 Hz which is road noise due to tire cavity resonance, but also in the frequency band near 160 Hz which is road noise due to suspension resonance.

In addition, because of their shape, circular rigidity adjusting areas resist the generation of bending vibration and twisting vibration in the rigidity adjusting areas themselves, so acoustic emission can be effectively reduced.

Moreover, circular rigidity adjusting areas are easier to machine than rectangular rigidity adjusting areas, and can be easily press-formed at the time of forming the rigidity adjusting areas in the floor panel, so the machining costs can be reduced.

Figure 8:
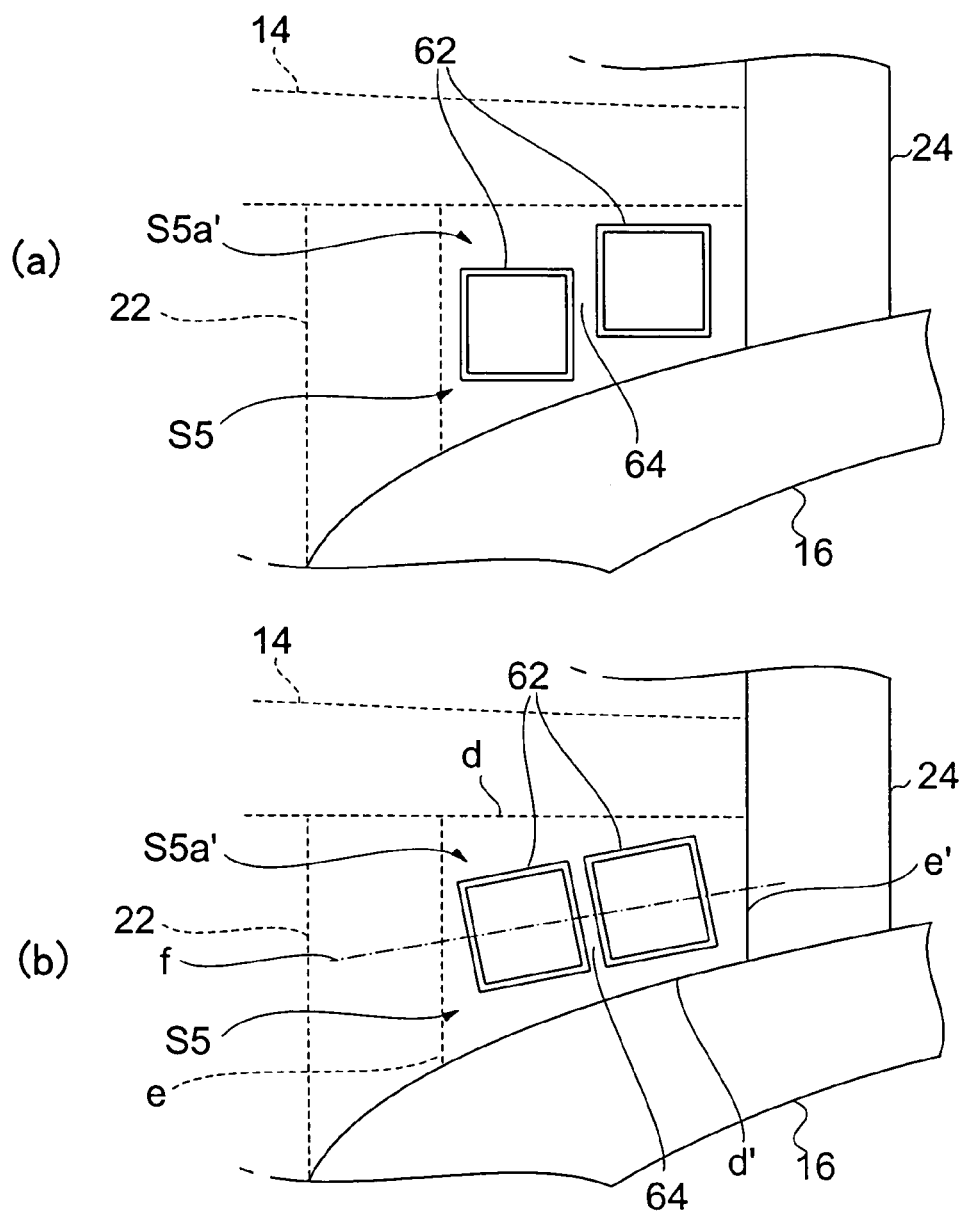
FIG. 8 is a top view of an example of Variations 1 and 2 of the vibration mode adjusting structure provided with floor panel sections S1 and S2 of an embodiment of the present invention when applied to floor panel section S5.
Figure 9:
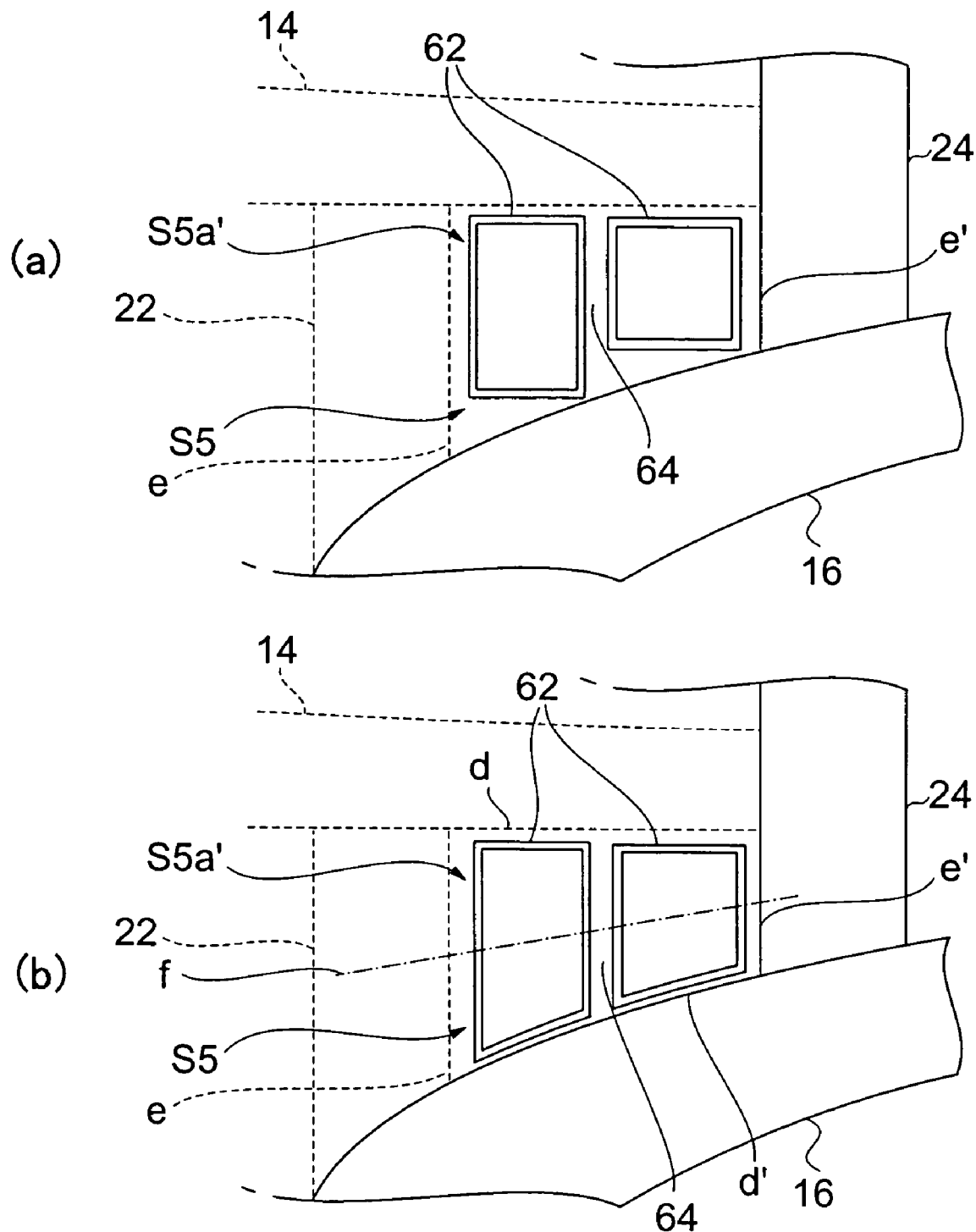
FIG. 9 is a top view of an example of Variations 3 and 4 of the vibration mode adjusting structure provided with floor panel sections S1 and S2 of an embodiment of the present invention when applied to floor panel section S5.

Here follows a description, made with reference to FIG. 8 and FIG. 9, of variations of the aforementioned rigidity adjusting areas which are the vibration mode adjusting structures in the embodiments described above, when applied to the region of the aforementioned floor panel section S5.

FIGS. 8(a) and (b) and FIGS. 9(a) and (b) are top views of Variation 1, Variation 2, Variation 3 and Variation 4 of the vibration mode adjusting structure, respectively.

In the floor panel sections S5' according to Variation 1-4, no reinforcing bead 46 is provided in floor panel section S5, but the vibration adjusting parts of the vibration mode adjusting structure are provided within the non-rectangular vibration region S5a' which is the region surrounded by the floor side frame 14, rear side frame 16, sub-cross member 22 and No. 3 cross member 24. These rigidity adjusting areas 62 are the same as the rigidity adjusting areas provided in floor panel sections S1 and S2 in FIG. 5 above, having a curved-surface portion 66 that protrudes downward and a step 68 formed in its outside edge.

Specifically, as shown in FIG. 8(a), two nearly square rigidity adjusting areas 62 are formed as the vibration mode adjusting structure according to Variation 1, being shifted in the car crosswise direction with respect to the non-rectangular vibration region S5a'. In addition, sides of the respective rigidity adjusting areas 62 are made to be parallel to and facing each other, while linear long, thin, flat panel portions 64 are formed between the adjacent rigidity adjusting areas 62.

As shown in FIG. 8(b), two nearly square rigidity adjusting areas 62 are formed as the vibration mode adjusting structure according to Variation 2, with the sides of each of the rigidity adjusting areas 62 being provided so as to extend in a direction roughly perpendicular to a line f passing through the rough center of the two long sides d and d'. In this variation, the respective centroids of the two roughly square rigidity adjusting areas 62 are disposed so as to lie upon line f. By disposing two rigidity adjusting areas 62 in this manner, one side of each of the respective rigidity adjusting areas 62 is made parallel to and facing each other and also, linear long, thin, flat panel portions 64 are formed between the adjacent rigidity adjusting areas 62.

As shown in FIG. 9(a), two rectangular rigidity adjusting areas 62 of differing sizes are formed as the vibration mode adjusting structure according to Variation 3, with the rigidity adjusting area 62 closer to short side e being formed so as to be nearly rectangular and the rigidity adjusting area 62 closer short side e' being formed so as to be nearly square. In addition, one side of each of the respective rigidity adjusting areas 62 is made parallel to and facing each other and also, linear long, thin, flat panel portions 64 are formed between the adjacent rigidity adjusting areas 62.

As shown in FIG. 9(b), two rectangular rigidity adjusting areas 62 of differing sizes and shapes are formed as the vibration mode adjusting structure according to Variation 4, with the rigidity adjusting area 62 closer to short side e being formed so as to be nearly rectangular and the rigidity adjusting area 62 closer short side e' being formed so as to be nearly square. These rigidity adjusting areas 62 are formed so that the sides of each adjacent to frame members 14, 16, 22 and 24 extend along the short sides e, e' or long sides d or d' of the frame members 14, 16, 22 and 24. In addition, one side of each of the respective rigidity adjusting areas 62 is made parallel to and facing each other and also, linear long, thin, flat panel portions 64 are formed between the adjacent rigidity adjusting areas 62. With the variation shown in this FIG. 9(b), the rigidity adjusting area 62 occupies a large portion of the surface area within this vibration region S5a', so each of the rigidity adjusting areas 62 reliably becomes the region in which the two respective antinodes of vibration of 2×1 mode are generated. Note that the sides of each of the rigidity adjusting areas 62 may be provided so as to extend in a direction roughly perpendicular to a line f passing through the rough center of the two long sides d and d'.

In these Variations 1-4, by providing the rigidity adjusting areas 62, in the non-rectangular vibration region S5a', 2×1 mode vibration is generated in the frequency band near 250 Hz which nearly matches the tire cavity resonance frequency and also 1×1 mode vibration is not generated in the frequency band near 160 Hz which is road noise due to suspension resonance.

In addition, in both Variations 1 and 2, the two rigidity adjusting areas 62 are disposed so as to be closer toward the front in the car body lengthwise direction, namely closer to short side e among the short sides e and e', and are adjusted so that the vibration volumes of the two antinodes of vibration in 2×1 mode are the same. In both Variations 3 and 4, the sizes and positions of the two rigidity adjusting areas 62 are adjusted so that the vibration volumes of the two antinodes of vibration in 2×1 mode are the same.

Note that in these variations, in order for the vibration volumes of the two vibrations to be made to be the same, the two rigidity adjusting areas 62 may be formed such that the sizes of their quadrilaterals, curvature and height of the curved-surface portion 66 and height and width of the step 68 are made different.

Here follows a description of an embodiment of the method of manufacturing a floor panel having the vibration mode adjusting structure according to the present invention. 10 is a flowchart of a manufacturing method using the design technique for floor panels having the vibration mode adjusting structure according to an embodiment of the present invention.

This manufacturing method adopts a design technique wherein, as the vibration mode adjusting structure, rigidity adjusting areas of such shape so as to be appropriate for reducing acoustic emission from the floor panel are selected from among: circular rigidity adjusting areas, rectangular rigidity adjusting areas with no step provided, or rectangular rigidity adjusting areas with a step provided.

Figure 10:
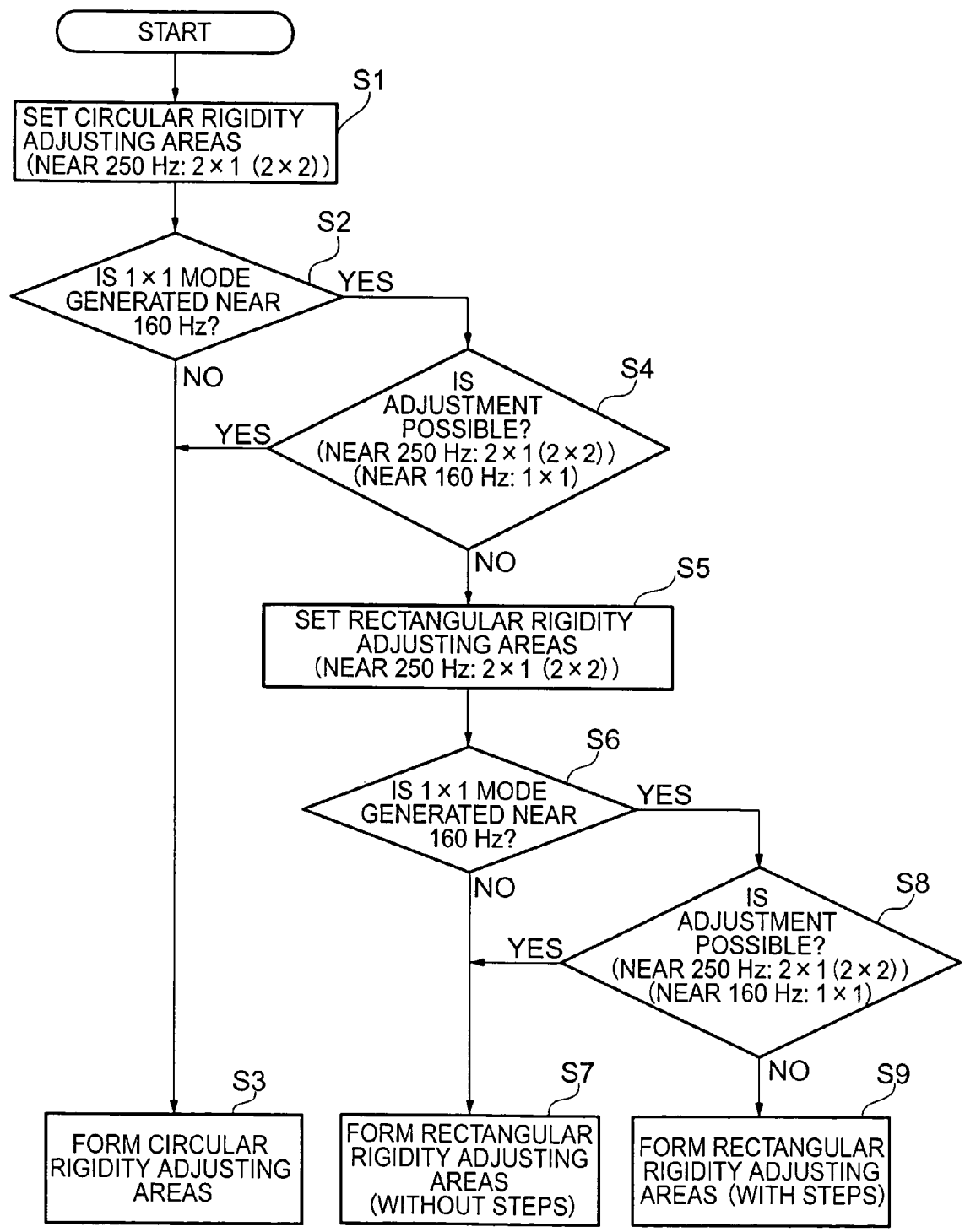
FIG. 10 is a flowchart of a manufacturing method using the design technique for floor panels having the vibration mode adjusting structure according to an embodiment of the present invention.

First, the manufacturing method according to this embodiment will be described in detail. Note that in FIG. 10, S indicates the individual steps.

In this example, in the various steps to be described below except for Steps S3, S7 and S9, analysis is performed by computer-aided engineering (CAE) (e.g., the finite element method (FEM)) in order to set or adjust the dimensions of the rigidity adjusting areas in the floor panel, thereby serving as the criteria for estimating the vibration modes and vibration frequencies and the like generated in the floor panel, and for selecting the shapes of the rigidity adjusting areas. As conditions specific to the automobile in which the floor panel is to be provided, these analyses take into consideration differences in the tire cavity resonance frequency depending on the type of tires to be installed, along with the details of the frequency band and acoustic emission level and the like where acoustic emission is a problem.

First, in Step S1, predetermined circular rigidity adjusting areas wherein the floor panel itself is caused to protrude upward or downward are set in the floor panel so that 2×1 mode or 2×2 mode vibration are generated in the frequency band near 250 Hz. In this embodiment, as the frequency band near 250 Hz, the frequency band at 220-260 Hz is set as the target value for the frequency at which the 2×1 mode or 2×2 mode vibration are generated.

In this Step S1, as described with respect to the floor panel sections S4 and S5 above, a circular rigidity adjusting areas 72 is set in the vibration region of the floor panel.

In this Step S1, rigidity adjusting areas of preset standard dimensions are set as the predetermined circular rigidity adjusting areas. These standard dimensions are based on data from experiments and the rigidity adjusting areas provided in other vehicles and the like.

In addition, as the predetermined rigidity adjusting areas, it is also possible to predict, from the frequency at which 2×1 mode or 2×2 mode vibration are generated in the flat floor panel prior to providing the rigidity adjusting areas, the amount of rigidity required in order to generate 2×1 mode (or 2×2 mode) in the frequency band near 250 Hz, and determine the dimensions from this amount of rigidity.

Here, the vibration regions of the floor panel sections refer to fixed regions in the floor panel surrounded by frame members, reinforcing beads or the like. For example, in the floor panel of the aforementioned embodiment illustrated in FIG. 4, this may be the region S1a in floor panel section S1 surrounded by the frame members 12, 14, 18 and 20, the vibration region S2b in floor panel section S2 surrounded by the frame members 14, 18 and 20, the region S5a in floor panel section S5 surrounded by frame members 14, 16, 22 and 24 and reinforcing bead 46, or other regions.

Next, advancing to Step S2, a determination is made as to whether or not 1×1 mode vibration is generated at the frequency band near 160 Hz in the floor panel in which the circular rigidity adjusting areas set in Step S1 are provided. In this example, the frequency band at 120-180 Hz is used as the target value for this frequency band near 160 Hz.

In Step S2, if 1×1 mode vibration is determined not to be generated in the frequency band near 160 Hz, advance to Step S3. In Step S3, rigidity adjusting areas of the same dimensions and layout as in the circular rigidity adjusting areas set in Step S1 are formed in the floor panel.

In Step S2, if 1×1 mode vibration is determined to be generated in the frequency band near 160 Hz, advance to Step S4. In Step S4, a determination is made as to whether or not, by adjusting the dimensions of the circular rigidity adjusting areas within the predetermined range, it is possible to generate 2×1 mode or 2×2 mode vibration in the frequency band near 250 Hz and also generate 1×1 mode vibration at frequencies outside the frequency band near 160 Hz.

Here, as the predetermined range for adjusting the dimensions of the circular rigidity adjusting areas, for example, when the rigidity adjusting areas are formed such that they protrude downward, if an exhaust pipe runs along the bottom of the car body along the floor panel where that rigidity adjusting area is to be formed, then this is the range of heights of the rigidity adjusting area that do not interfere with the exhaust pipe. In addition, if the thickness of the floor panel is so great that press-forming is difficult, then this is the range (diameter and height of the circular rigidity adjusting areas) at which press-forming is possible. In addition, this may be the range of diameters of the rigidity adjusting areas that are to be enclosed within the floor panel vibration regions in which the rigidity adjusting areas are to be formed.

The determination made in Step S4 is made by performing an analysis of the rigidity adjusting areas subjected to adjustment of a plurality of dimensions by CAE as described above, and then making the determination based on these results, or by making a determination from a database of experimental data or the like.

In Step S4, if it is determined that, by adjusting the dimensions of the circular rigidity adjusting areas within the predetermined range, it is possible to generate 2×1 mode or 2×2 mode vibration in the frequency band near 250 Hz and also generate 1×1 mode vibration at frequencies outside the frequency band near 160 Hz, then advance to Step S3. In Step S3, circular rigidity adjusting areas adjusted to dimensions at which it is possible to generate 2×1 mode or 2×2 mode vibration in the frequency band near 250 Hz and also generate 1×1 mode vibration at frequencies outside the frequency band near 160 Hz are formed in the floor panel.

In Step S4, if it is determined that, by adjusting the dimensions of the circular rigidity adjusting areas within the predetermined range, it is not possible to generate 2×1 mode or 2×2 mode vibration in the frequency band near 250 Hz and also generate 1×1 mode vibrations at frequencies outside the frequency band near 160 Hz, then advance to Step S5. In Step S5, rectangular rigidity adjusting areas formed by causing the floor panel itself to protrude upward or downward, so that 2×1 mode or 2×2 mode vibration are generated in the frequency band near 250 Hz, are formed in the floor panel. Note that no step 68 (see FIG. 5) as described above is provided in the rectangular rigidity adjusting areas set in this Step S5.

Here, as described in the floor panel sections S5 and S6 in the aforementioned embodiment, when the rigidity adjusting areas are rectangular, 1×1 mode vibration itself is not generated as readily as in the case in which the rigidity adjusting areas are circular, or even if they are generated, the frequency at which they are generated can be made closer to the frequency at which 2×1 or 2×2 vibration mode are generated. Thus, in the steps after this Step S5, by changing the shape of the rigidity adjusting areas from circular to rectangular, 2×1 mode or 2×2 mode vibration are generated in the frequency band near 250 Hz and also 1×1 mode vibration is generated at frequencies outside the frequency band near 160 Hz.

Next, advancing to Step S6, a determination is made as to whether or not 1×1 mode vibration is generated in the frequency band near 160 Hz in a floor panel in which the rectangular rigidity adjusting areas with no step provided as set in Step S5.

In Step S6, if it is determined that no 1×1 mode vibration is generated in the frequency band near 160 Hz, advance to Step S7. In Step S3, rigidity adjusting areas of the same dimensions and layout as in the rectangular rigidity adjusting areas with no steps provided set in Step S5 are formed in the floor panel.

In Step S6, if it is determined that 1×1 mode vibration is generated in the frequency band near 160 Hz, advance to Step S8. In Step S8, a determination is made as to whether or not, by adjusting the dimensions of the rectangular rigidity adjusting areas within the predetermined range (in the same manner as in Step S4), it is possible to generate 2×1 mode or 2×2 mode vibration in the frequency band near 250 Hz and also generate 1×1 mode vibration at frequencies outside the frequency band near 160 Hz.

In Step S8, if it is determined that, by adjusting the dimensions of the rectangular rigidity adjusting areas within the predetermined range, it is possible to generate 2×1 mode or 2×2 mode vibration in the frequency band near 250 Hz and also generate 1×1 mode vibration at frequencies outside the frequency band near 160 Hz, then advance to Step S7. In Step S7, rectangular rigidity adjusting areas adjusted to dimensions at which it is possible to generate 2×1 mode or 2×2 mode vibration in the frequency band near 250 Hz and also generate 1×1 mode vibration at frequencies outside the frequency band near 160 Hz are formed in the floor panel.

In Step S8, if it is determined that, by adjusting the dimensions of the circular rigidity adjusting areas within the predetermined range, it is not possible to generate 2×1 mode or 2×2 mode vibration in the frequency band near 250 Hz and also generate 1×1 mode vibration at frequencies outside the frequency band near 160 Hz, then advance to Step S9. In Step S9, steps are provided in rectangular rigidity adjusting areas of dimensions such that the highest value of the generation frequencies for 1×1 mode are obtained, and those rectangular rigidity adjusting areas are formed in the actual floor panel at the layout set in Step S5.

In this Step S8, for example, rectangular rigidity adjusting areas 62 with a cross section consisting of a curved-surface portion 66 and step 68 as shown in FIG. 5 are formed in the actual floor panel as shown in the floor panel sections S1 and S2 shown in FIG. 4. In this Step S8, the height and width of these steps are adjusted so that 2×1 mode or 2×2 mode vibration are generated in the frequency band near 250 Hz and also 1×1 vibration mode are generated at a frequency band higher than the frequency band near 160 Hz which is road noise due to suspension resonance.

Here, as described in floor panel sections S1 and S2 according to the aforementioned embodiment, when a step is provided in the outside edge of the rectangular rigidity adjusting area, the 1×1 mode vibration itself is generated even less readily than in rigidity adjusting areas in which no step is provided, or the frequency at which they are generated can be made even closer to the frequency at which 2×1 or 2×2 vibration mode are generated. Thus, in this Step S9, by means of the rectangular rigidity adjusting areas provided with a step in their outside edges, 2×1 mode or 2×2 mode vibration are generated in a frequency band near 250 Hz and also 1×1 mode vibration is generated at frequencies outside the frequency band near 160 Hz.

Note that it is also possible to set rigidity adjusting areas with steps provided in Step S5, readjust the height and width of the steps of those rigidity adjusting areas in Step S8 and then make a determination as in Step S8 above.

Although the present invention has been explained with reference to specific, preferred embodiments, one of ordinary skilled in the art will recognize that modifications and improvements can be made while remaining within the scope of the appended claims.

What is claimed is:

1. A floor panel structure of a car body where an automobile floor has a floor panel that is connected to frame members of the car body, said floor panel comprising:
   a vibration mode adjusting structure which generates a predetermined mode of vibration and thus suppresses the generation of acoustic emissions;
   said floor panel vibration mode adjusting structure having rectangular shaped rigidity adjusting parts that protrude above or below said floor panel so that 2×1 mode vibration is generated in said floor panel in a predetermined frequency band, and
   said vibration mode adjusting structure has two rectangular rigidity adjusting parts that are disposed such that one side of each of said rigidity adjusting parts is parallel to and facing the other, and a long, thin panel portion is formed between the rigidity adjusting parts, thus generating 2×1 mode vibration.

2. The floor panel structure of a car body according to claim 1, wherein said predetermined frequency band is a frequency band that nearly matches the tire cavity resonance frequency.

3. The floor panel structure of a car body according to claim 1, wherein said predetermined frequency band is a frequency band near 250 Hz.

4. A floor panel structure of a car body where an automobile floor has a floor panel that is connected to frame members of the car body, said floor panel comprising:
   a vibration mode adjusting structure which generates a predetermined mode of vibration and thus suppresses the generation of acoustic emissions;
   said floor panel vibration mode adjusting structure having rigidity adjusting parts that protrude above or below said floor panel so that 2×1 mode vibration is generated in said floor panel in a frequency band near 250 Hz; and
   said rigidity adjusting parts being formed in a circular shape in the case that 1×1 mode vibration can be generated in a frequency band outside those near 160 Hz, but said rigidity adjusting parts are formed in a rectangular shape in the case that 1×1 mode vibration cannot be generated in a frequency band outside those near 160 Hz,
   wherein said vibration mode adjusting structure has two rectangular rigidity adjusting parts that are disposed such that one side of each of said rigidity adjusting parts is parallel to and facing the other, and a long, thin panel portion is formed between the rigidity adjusting parts, thus generating 2×1 mode vibration.

5. The floor panel structure of a car body according to claim 4, wherein said predetermined frequency band is a frequency band that nearly matches the tire cavity resonance frequency.

6. The floor panel structure of a car body according to claim 4, wherein said predetermined frequency band is a frequency band near 250 Hz.

7. A method of manufacturing a car body floor panel that is connected to frame members of the car body, thereby constituting the floor of an automobile, and that also have a vibration mode adjusting structure which generates a predetermined mode of vibration and thus suppresses the generation of acoustic emissions, where the vibration mode adjusting structure is provided with circular and rectangular rigidity adjusting parts, said method comprising the steps of:

forming circular rigidity adjusting parts in the case that 2×1 mode or 2×2 mode vibration is generated in a frequency band near 250 Hz, and also 1×1 mode vibration can be generated in a frequency band outside those near 160 Hz by adjusting the dimensions of said circular rigidity adjusting parts within a predetermined range;

forming rectangular rigidity adjusting parts that do not have steps in their outside edges in the case that 1×1 mode vibration cannot be generated in a frequency band outside those near 160 Hz, even if the dimensions of the circular rigidity adjusting parts are adjusted within a predetermined range, and in the case that 2×1 mode or 2×2 mode vibration is generated in a frequency band near 250 Hz and also 1×1 mode vibration is generated in a frequency band outside those near 160 Hz by adjusting the dimensions of said rectangular rigidity adjusting parts that do not have steps in their outside edges within a predetermined range; and forming rectangular rigidity adjusting parts that have steps in their outside edges in the case that 1×1 mode vibration cannot be generated in a frequency band outside those near 160 Hz, even if the dimensions of the rectangular rigidity adjusting parts that do not have steps in their outside edges are adjusted within a predetermined range, and in the case that 2×1 mode or 2×2 mode vibration is generated in a frequency band near 250 Hz and also 1×1 mode vibration is generated in a frequency band outside those near 160 Hz by adjusting the dimensions of said rectangular rigidity adjusting parts that have steps in their outside edges within a predetermined range.

* * * * *